Jan. 18, 1927.

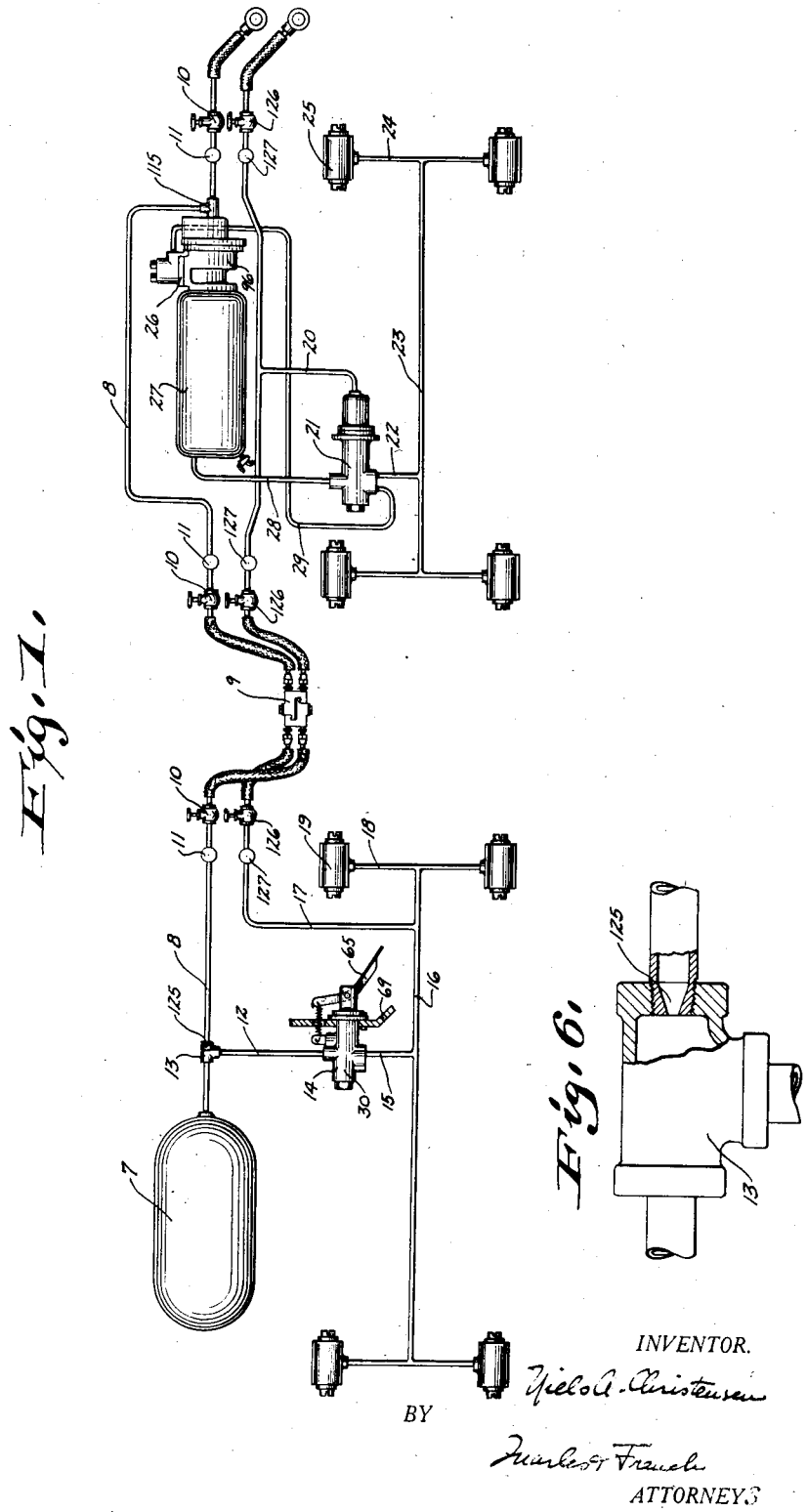

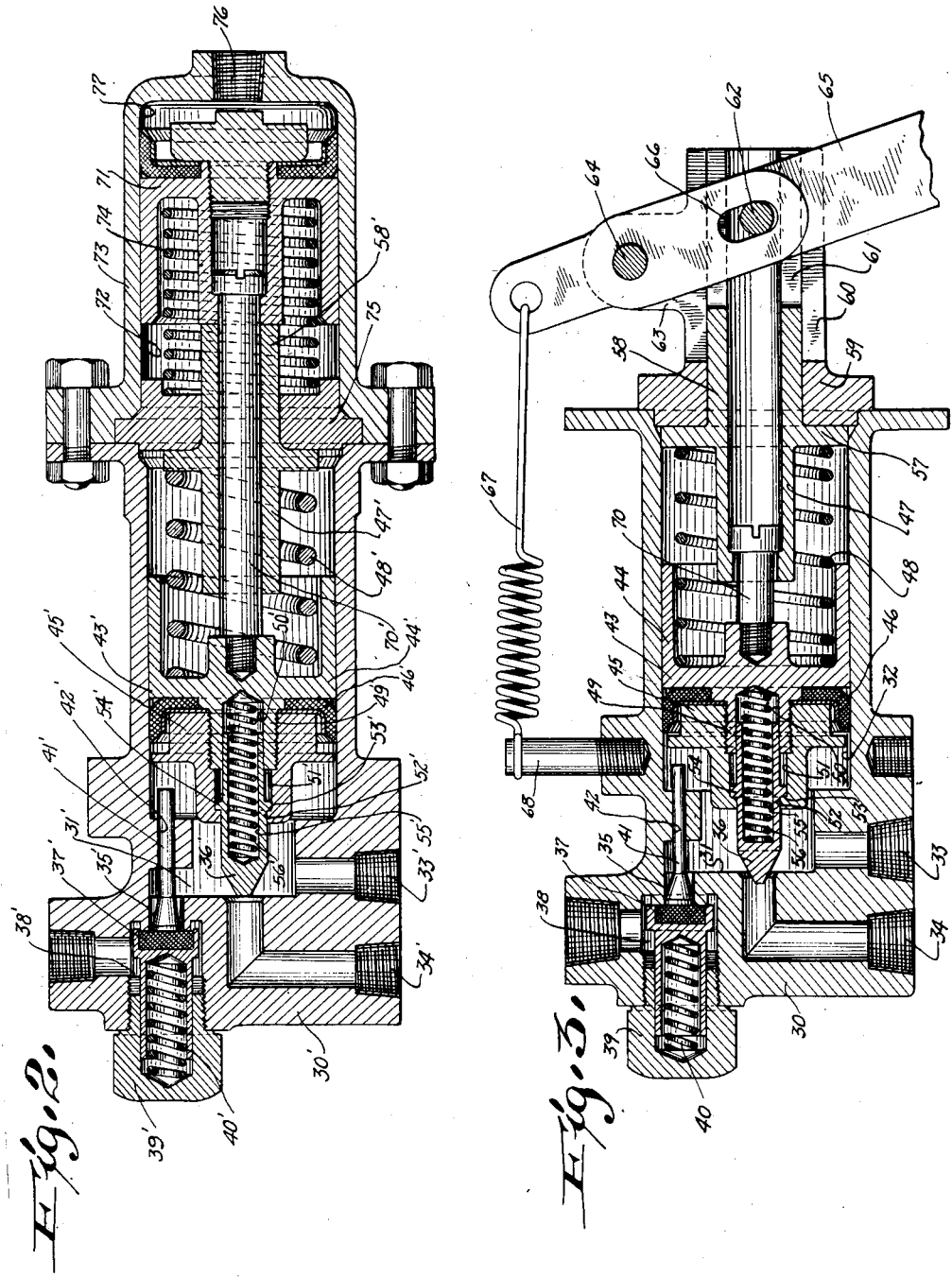

N. A. CHRISTENSEN 1,614,653

COMPRESSED AIR BRAKE SYSTEM FOR MOTOR VEHICLE TRAINS

Filed Jan. 11, 1926   3 Sheets-Sheet 3

INVENTOR
Niels A. Christensen

BY
Herbert French
ATTORNEY

Patented Jan. 18, 1927.

1,614,653

UNITED STATES PATENT OFFICE.

NIELS A. CHRISTENSEN, OF CLEVELAND, OHIO.

COMPRESSED-AIR BRAKE SYSTEM FOR MOTOR-VEHICLE TRAINS.

Application filed January 11, 1926. Serial No. 80,577.

The invention relates to air brake systems for vehicle trains.

In my prior application, Serial No. 65,024, filed October 26, 1925, for straight and automatic air brake systems, I have disclosed a system in which the driven vehicle and each of the trailer vehicles may be operated on straight air or be automatically operated through triple valve mechanism associated with the brake system of each vehicle. The present invention is a modification of this system in that while the brakes on all the vehicles are operated by straight air, the automatic brake application is used only on the trailer vehicles, and the driving vehicle is at all times operated by straight air brake application.

The invention further consists in the several features hereinafter described and more particularly defined by claims at the conclusion hereof.

In the drawings, Fig. 1 is a diagrammatic view of an air brake system embodying the invention;

Fig. 2 is a vertical sectional view through the control valve mechanism of one of the trailer vehicles;

Fig. 3 is a vertical sectional view through the control valve mechanism of the driving vehicle;

Fig. 6 is a detail sectional view through a part of the piping of the system.

Figure 4:
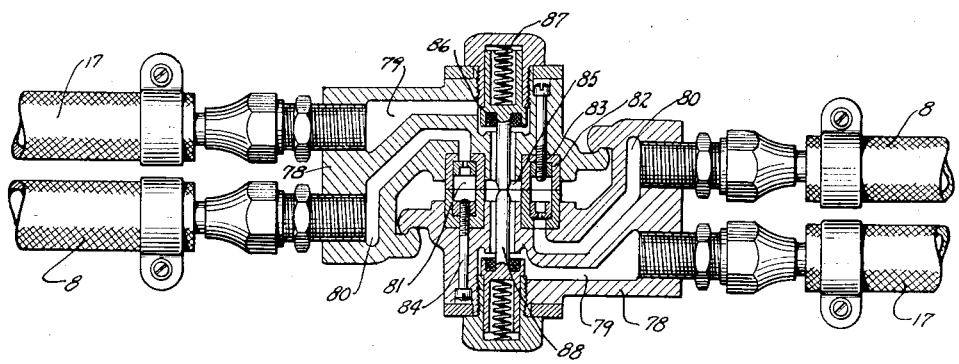
Fig. 4 is a vertical sectional view of the coupling between vehicles.

Referring to Fig. 1 of the drawings, the numeral 7 designates the main reservoir, which is supplied with air in any suitable manner, and generally from a compressor associated with the engine of the tractor vehicle.

The main reservoir pipe 8, which extends the length of the train, is composed of pipe sections on each vehicle which are connected between the vehicles by coupling devices 9, as hereinafter described, the piping also including shut-off valves 10 and air strainers 11. The pipe 12 connects with a fitting 13 in the reservoir pipe line and leads to the master or operator's control valve 14. From the control valve 14 compressed air is introduced into the brake system of each of the vehicles through pipes 15, 16 and 17. The pipe 17 is the brake supply pipe and may be directly associated with the pipe 15, if desired, but as shown in the drawings it is associated with the pipe 16, which is a distributor pipe for the brake pipes 18 associated with the brake cylinders 19 of the tractor vehicle.

On each of the trailer vehicles a pipe 20 leads off from the pipe 17 to the control valve mechanism 21 of the trailer vehicle, by which compressed air is introduced into or exhausted from the brake system of that vehicle through pipes 22, 23 and 24 connected with the brake cylinders 25 of the control vehicle. On each of the trailer vehicles triple valve mechanism 26 is provided, including an auxiliary reservoir 27. A pipe 28 connects the auxiliary reservoir with the trailer control valve mechanism 21, and a pipe 29 connects the control valve mechanism 21, and the triple valve mechanism.

The master or operator's control valve mechanism is shown in detail in Fig. 3, and comprises a casing 30 having a space 31 therein including a bore 32. A brake pipe passage 33, a valve-controlled exhaust passage 34, and a valve-controlled inlet passage 35 communicate with the space 31. A relief valve 36 controls the flow of compressed air from the space 31 to the passage 34 and thence to atmosphere, and an inlet valve 37 controls the flow of compressed air from a chamber 38 to the space 31, and the pipe 12 communicates with the chamber 38. The passage 33 is connected by the pipe 15 to the piping 16 associated with the brake cylinders of the tractor vehicle.

The inlet valve 37 has a tubular portion slidably mounted in the bore of a box-nut 39 and is held against its seat by a spring 40 interposed between the end of said bore and the outer end of the bore in the nut 39.

A push-pin 41 is slidably mounted in the passage 35 and has a stem portion mounted in a bore 42 formed in the casing. The head of this pin engages the head of the inlet valve 37 and may be of tapered form for graduating the passage of air through the passage 35.

A piston 43 formed of parts 44 and 45 in clamping association with a flexible packing 46 works in the bore 32 and is moved in one direction by pressure transmitted to it from a plunger 47 by a spring 48, and in the opposite direction by fluid pressure acting against its inner end. The part 44 has a recess in which the spring seats and a threaded tubular end portion 49 with a bore 50. The part 45 has threaded engagement with the portion 49 whereby the medial portion of the packing disk 46 is clamped between said parts, and it has bores 51 and 52 alined with the bore 50, the bore 52 being of smaller diameter than the bore 51 to form a stop flange 53.

The relief or exhaust valve 36 is in the form of a poppet needle type valve having a conical head adapted to seat on the inner end of the passage 34 and having a tubular stem provided with a flange 54 and a bore 55. A spring 56 is mounted in the bore 55 and interposed between the end of said bore and the inner end of the bore 50, and said spring normally acts to move the valve 36 so that its flange 54 abuts against the flange 53. The valve 36 is not responsive to the air pressure in the space 31 to effect its opening, but its change in position is due directly to the position and movement of the piston 43.

The plunger 47 has a spring-seating flange 57 and a cylindrical tubular guide portion 58 which is guided in the tubular extension 59 secured to the casing 30 by bolts, or other suitable securing means passing through flanges on the casing and said extension, said extension having vertically disposed slots 60 therein. The end of the cylinder guide portion 58 has a vertically disposed slot 61 formed therein and carries a pin 62. Spaced lugs 63 are also provided on the extension 59 and have a fulcrum pin 64 mounted therein.

The foot-pedal or lever 65 is pivoted on the pin 64, works in the slots 60 and 61, and has a slot 66 through which the pin 62 passes. This lever, by means of a spring 67 secured to it and to a stud 68 mounted on the casing, is moved with the plunger 47 associated with it through the pin-and-slot connection 62, 66, above described, to its outer position in which the spring 48 is relieved, or substantially relieved, of its tension. When, however, the operator presses down on the lever 65, the plunger 47 is moved inwardly, putting a tension on the spring 48 which thereby transmits its force to the piston 43, causing it to move inwardly. The casing 30 is adapted to be mounted on the dash 69 of the tractor vehicle.

The piston 43 may move with the plunger 48 near the end of the outward movement of said plunger, because of the connection between these parts, consisting of a screw 70 whose head seats in the inner end of the plunger 47 and is slidably mounted in the bore thereof and whose threaded end engages a boss on the part 44 of the piston, as shown in Fig. 3. As shown in Fig. 3, the parts are in non-application position, and it will be noted that the relief or exhaust valve 36 is open and that the stem of the operating pin 41 is spaced from the inner end of the piston at a greater distance than is necessary to cause the travel of said piston to seat the valve 36.

To make a brake application the operator presses down on the lever 65 and hence moves the plunger 47 inwardly, which, through the spring 48, causes the inward movement of the piston 43 and this in turn, through the spring 55, causes the exhaust valve 36 to be moved to its seat to close off the exhaust passage 34. Further inward movement puts pressure upon the valve 36, through compression of the spring 48, and this movement also causes the piston 43 to engage the pin 41 and move it to open the inlet valve 37, whereupon compressed air coming from the reservoir 7 through the pipes 8 and 12 enters the space 31 and thence passes through the passage 33 to the pipe 15 and thence to the brake cylinders 19 and to the brake pipe 17. As the pressure in the brake system builds up the pressure in the space 31 in front of the piston 43 increases until it overcomes the pressure being exerted by the operator through the spring 48, and when said pressure exceeds the pressure of the spring 48 the piston 43 travels away from the stem 41 and the inlet valve closes and the parts are then in "lap" position, since the piston travel then is not sufficient to relieve the pressure on the spring 55 to such an extent as to permit unseating of the valve 36 which, it will be noted, has a greater tendency to remain seated because of the pressure in the chamber 31 then to be opened because of the differential area of the seat and the valve. Thereafter, the release of the pressure on the spring 48, by release of pressure on the foot-pedal, causes the piston 43 to travel outward due to pressure exerted on it by the compressed fluid in the space 31 and when flange 53 engages the flange 54 it will cause an opening of the relief valve 36 and the exhaust of air from the brake system through exhaust passage 34 open to atmosphere.

Each of the control valve mechanisms 21 for the trailer vehicles is generally similar to the master control valve previously described, except that their operating piston is operated by compressed air obtained from the brake pipe 17. Briefly, they include a casing 30', similar to the casing 30, provided with a brake passage 33' and an exhaust passage 34' and inlet passage 35'. The relief valve 36' controls the passage of air through the passage 34' and the inlet valve 37' controls the passage of air from the chamber 38' through the passage 35'. The passage 33' is connected by the pipe 22 to the piping 23 and 24 and the brake cylinders 25 associated with the trailer vehicle on which the control valve 21 is mounted. The pipe 28 connects the auxiliary reservoir of each triple valve mechanism with the chamber 38' of its control valve, and the pipe 29 connects the passage 34' of each control valve with the triple valve mechanism hereinafter described.

The parts 39' to 58', inclusive, are similar to parts 39 to 58, inclusive, of the valve 14, and similarly mounted and arranged, as in the previously described construction, with the exception that the plunger 47' of the valve 21 does not have a slotted end, but abuts against a suitably packed piston 71 which works in a bore 72 formed in an extension 73 bolted to the casing 30', and a spring 74 is interposed between the piston and a guide 75 for the plunger 47' and acts to move said piston outwardly. Compressed air is introduced from the pipe 20 through a bore 76 against the piston 71. A bolt 70' extends through the plunger 47' and connects the piston 43' with the piston 71 but permits the piston 43' to move relative to the plunger 47' and the piston 71. The piston 71 is somewhat larger in diameter than the compensating piston 43' in the valve proper.

Thus, when the operator steps on the foot-pedal 65 and admits air into the brake pipes 15, 16 and 17, air passes into the pipe 20 associated with each of the trailer vehicles, through the bore 76 and into the space 77 of the control valve. This air acting against the piston 71 of each valve 21 moves the plunger 47' and thereafter through the spring 48' moves the piston 43' and effects the closing of the exhaust valve 36' and the opening of the inlet valve 37' in the same manner that the exhaust valve 36 and the inlet valve 37 are operated in the master valve 14, and the compensating action previously described in connection with the main control valve 14 is similarly effected by similar parts in the valve 21 of each trailer. Thus the operation of the master valve 14 by the operator causes an introduction of compressed air from the auxiliary reservoir 27 through the space 31' to the pipes 22 and thence to the brake system of each trailer, including pipes 23 and 24 and the brake cylinders 25.

The compensating action above referred to is effected in each of the valves 21 since when the pressure builds up in the chamber 31 to close off the inlet valve 37, this same pressure builds up in the chamber 31' from the auxiliary reservoir 27 to close off the inlet valve 37', and the closing off of the inlet valve 37 stops further building up of pressure in the piping, including the pipe 20 associated with the piston 71.

The spring 74 is a comparatively light spring and is used more particularly to overcome the friction of the piston 71 to return it to a release position.

The sections of the pipe 17 between each of the vehicles may be connected by a suitable coupling in which provision is made for sealing the end of each of these pipe connections when the vehicles are uncoupled. The sections of the reservoir pipe 8 may also be connected with a suitable coupling, but I prefer to use a single coupling device for the sections of this pipe and the sections of the pipe 17, and such device is shown in Fig. 4. As the particular construction of this coupling has been made the subject matter of a separate application, it will be only briefly described here.

This coupling includes a pair of interlockable coupling members 78 having passages 79 and 80 therein. The passages 80 communicate with each other through an annular space 81 formed by cooperating annular flexible packing rings 82, each of which is secured to its respective coupling member by a metal ring 83 and bolts 84, the passages 79 communicating with each other through a central passage 85 formed by the abutting rings 82, and a spring-closed check valve 86 is mounted in each of the passages 79 and urged by a spring 87 to close off said passage when coupling members become separated, but when the coupling members are coupled together the pin extensions 88 of these valves are brought into abutting engagement with each other and move the valves off their seats so that through passage of air is established between the pipe sections 17.

Couplings of the character described are used between each of the trailer vehicles so that the pipes 8 and 17 extend the entire length of the train.

Figure 5:
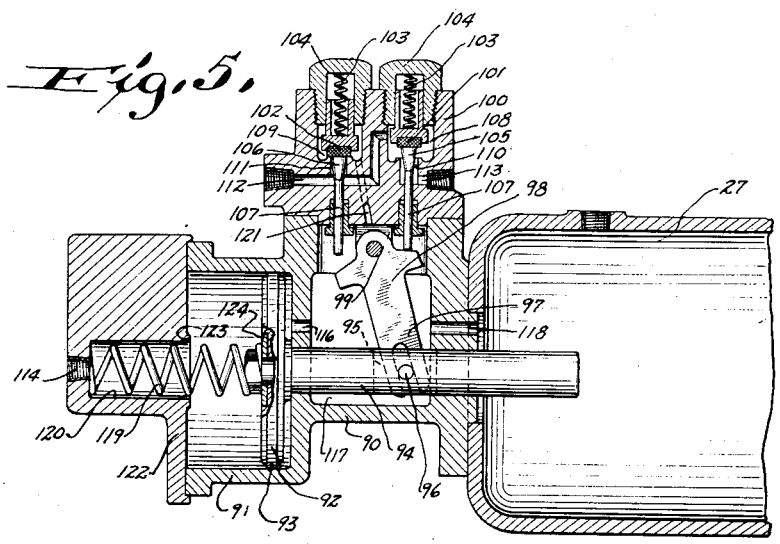
Fig. 5 is a detail vertical sectional view through the triple valve mechanism, shown in release position.

The triple valve mechanism 26 which is mounted on each of the trailer vehicles includes the auxiliary reservoir 27 and a housing 90, including a cylinder 91 in which the valve-operated piston 92 works, see Fig. 5. This piston is provided with the usual packing ring 93 and its rod 94 works through the lower end of the cylinder 91 and is slotted at 95 intermediate its ends and provided with a cross-pin 96, and the depending slotted end 97 of a T-headed lever 98 engages this pin within the slotted portion of said rod and is thereby moved by the pin 96. The lever 98 is mounted on a fulcrum pin 99 carried by a depending part of the valve housing 100 containing valves 101 and 102, urged to their seats by springs 103 mounted between the tubular parts of said valves and the box-nuts 104. These valves 101 and 102 are respectively operated by pins 105 and 106. The stems of said pins are preferably packed by suitable stuffing-boxes 107. The valves 101 and 102 are held to their seats by their springs unless opened by the lever 98 whose arms, upon the swinging of said lever by the piston 92 and its rod, are adapted to alternately open and close said valves by movement of the operating pins 105 and 106. The housing 100 is securely mounted in an air-tight manner upon the housing 90.

The valves 100 and 102 work in chambers 108 and 109 which communicate respectively, when the valves are open, with ports 110 and 111. The port 111 communicates with a passage 112 connected by the pipe 29 with the exhaust passage 34' of the control valve 21, said passage 112 also communicating with the chamber 108. The passage 110 communicates with a duct 113 leading to atmosphere.

Main reservoir pressure in the pipe 8 is introduced into the head end of the cylinder 91 through a passage 114 connected by a fitting 115 with the reservoir pipe 8. The rear end of the cylinder 91 communicates with the auxiliary reservoir through a port 116, chamber 117 and port 118. There is sufficient leakage between the piston 92 and its cylinder to allow compressed air to equalize itself on both sides of the piston and to allow compressed air to pass around said piston through the port 116, chamber 117 and port 118 to the auxiliary reservoir 27 to fill it with air to the same pressure as that of the pipe 8 and the auxiliary reservoir 27.

A spring 119 is mounted in a bore 120 in the cylinder head of the cylinder 91 and bears against the front end of the piston 92 and is of a strength to normally move the piston toward the auxiliary reservoir so as to maintain the exhaust valve 105 in open position, as shown in Fig. 5, and thus keep the inlet valve 102 closed.

The passage 121 connects the space 117 with the chamber 109. The head end 122 of each triple valve cylinder 91 has a rounded seat 123 formed thereon which cooperates with a composition disk 124 on the front end of the piston to seal the bore 120 and the piping connected therewith to prevent the escape of air at auxiliary reservoir pressure when the piston 92 is at the end of its brake-applying stroke, that is, when it is moved against the head 122 and has operated the pin 107 to open the inlet valve 102, which admits air from the auxiliary reservoir 27 into the brake system of the trailer vehicle by way of the port 118, chamber 117, passage 121, chamber 109, passages 111 and 112, pipe 29, passage 34', space 31', passage 33' to pipe 22 and thence through piping 23, 24, to the brake cylinders 25, this action taking place in case any one of the couplings pull apart, so that there is a reduction in pressure in the reservoir pipe line 8.

Thus, when any one of the trailer vehicles becomes separated from the rest of the train, or from the tractor vehicle, the triple valve mechanism of the separated trailer will operate automatically to apply the brakes on the trailers. However, the operation of the master control valve 14 by the operator causes the operation of the control valve mechanism 21 of each of the trailer vehicles, as previously described, and this permits the compressed air from the auxiliary reservoir 27 of each of the trailer vehicles to flow direct to the brake system associated with that vehicle and pass the then open inlet valve 37' and to the brake pipe 33' and pipes 22, 23 and 24, and the release of air from the brake system of each of the trailer vehicles is then effected through the then normally open exhaust valve 101 of the triple valve mechanism, from the pipes 24, 23, 22, passages 33', 34' and pipe 29.

To prevent the rapid decrease of pressure from the main reservoir 7 to the pipe 12, upon the separation of any of the trailer vehicles from the tractor vehicle, a part 125 of the pipe 8 is of relatively smaller diameter compared to other sections of the brake pipe and extends into the fitting 113 and provides a restriction of flow so that the air from the main reservoir 7 does not escape as freely as it otherwise would, with the result that in case of separation of the trailer vehicles the operator of the tractor vehicle can stop this vehicle and shut off the valve 10 on this vehicle until he can again couple up the separated trailer or trailers. The sections of the brake-supply pipe 17 are also provided with shut-off valves 126 and air strainers 127. With this construction, under normal conditions air from the reservoir 7 passes through the reservoir pipe 8 and into each of the triple valve mechanisms to fill the auxiliary reservoir 27 by way of the fittings 115 and the loose piston 92, as previously described, thereby charging the auxiliary reservoir with air at the same pressure as the main reservoir.

To make a brake application the operator presses down on the foot-pedal 65 and this, as previously noted, admits air from the main reservoir through pipes 12, 15 and 16 to the brake pipes 18 and hence to the brake cylinders 19 of the tractor vehicle, and at the same time the air passes through the brake pipe 17 to the pipes 20 on each of the trailer vehicles, operating the control valve 21 on each of these vehicles to admit air from the auxiliary reservoir 27 to the pipes 28, 22, 23 and 24 to the brake cylinders 25 of each of the trailer vehicles, the triple valve mechanism being then maintained in its normal release position. When, as previously stated, any one of the trailer vehicles pull apart, the triple valve mechanism is actuated to admit air from its auxiliary reservoir to its brake system. Thus, for straight air brake application the triple valve mechanism of each trailer remains in release position and speedy application of air to the trailer vehicles is assured by the direct passage of air from their auxiliary reservoirs through their control valves to their brake pipes and cylinders, and a speedy release is also obtained through the open exhaust valve of the triple valve mechanism, but the tractor vehicle has its brakes operated directly by compressed air from the main reservoir and may be stopped in the usual manner upon the separation of the trailer vehicles, and the slow escape of air from the main reservoir through the restriction in pipe 8 prevents rapid loss of air from the main reservoir while the train is being coupled up.

It will be understood that the rear end of the reservoir pipe 8 and that of the brake or control-valve-operating pipe 17 are closed off by the valves 10 and 126 at the end of the train.

Reference is here made to my copending application Serial No. 23,847, filed April 17, 1925, for brake control valve, wherein the control valve mechanisms shown in this system are more specifically described and claimed and since the present application is directed to an air brake system absence of claims to the particular features of construction of the control valve mechanisms herein is not to be considered as a waiver of claim to invention therefor, as such features have been claimed in the aforementioned application.

I desire it to be understood that this invention is not to be limited to any particular arrangement or construction of parts except in so far as such limitations are included in the claims.

What I claim as my invention is:

1. In a vehicle train air brake system, the combination with the main reservoir and a reservoir pressure pipe connected therewith, of brake cylinders on the tractor vehicle, means for operating said brake cylinders entirely by compressed air direct from the main reservoir, brake cylinders on each of the trailer vehicles, triple valve mechanism associated with the brake cylinders of each trailer vehicle, and including an auxiliary reservoir, means for supplying the brake cylinders of the trailer vehicles with compressed air from their auxiliary reservoirs when the brake cylinders of the tractor vehicle are supplied with compressed air, and means for automatically supplying air to the brake cylinders of a trailer vehicle by the automatic operation of its triple valve mechanism upon the release of reservoir pipe pressure due to a disconnection of part of the reservoir supply pipe.

2. In a vehicle train air brake system, the combination with the main reservoir and a reservoir pipe connected therewith, of brake cylinders on the tractor vehicle, means for operating said brake cylinders entirely by compressed air direct from the main reservoir, brake cylinders on each of the trailer vehicles, triple valve mechanism associated with the brake cylinders of each trailer vehicle and including an auxiliary reservoir, operator-controlled valve mechanism for the brake cylinders of the tractor vehicle, control valve mechanism associated with the auxiliary reservoir and triple valve mechanism of each trailer vehicle and rendered operative by the operation of the control valve mechanism of the tractor vehicle, and means permitting the operation of the triple valve mechanism of a trailer vehicle to operate its brakes upon a reduction of reservoir pipe pressure upon the separation of the trailer from the tractor vehicle.

3. In a vehicle train air brake system, the combination with the main reservoir and a reservoir pressure pipe connected therewith, of brake cylinders on the tractor vehicle, brake pipe leading from the reservoir pipe to said brake cylinders, brake cylinders on each of the trailer vehicles, triple valve mechanism associated with the brake cylinders of each trailer vehicle and including an auxiliary reservoir, means for supplying the brake cylinders of the trailer vehicles with compressed air from their auxiliary reservoirs when the brake cylinders of the tractor vehicle are supplied with compressed air, and means for automatically supplying air to the brake cylinders of a trailer vehicle by the automatic operation of its triple valve mechanism upon the release of reservoir pipe pressure due to a disconnection of parts of said pipe, said reservoir pipe having a restriction therein beyond the brake piping connection on the tractor vehicle to prevent rapid escape of air from the reservoir in case the sections of said reservoir pipe between the vehicles become separated.

In testimony whereof, I affix my signature.

NIELS A. CHRISTENSEN.